June 16, 1931.  R. J. MUSTO  1,810,251

ELECTRIC ARC WELDING PLANT

Filed July 25, 1929   2 Sheets-Sheet 1

INVENTOR
Romeo J. Musto.
BY Gill & Jennings
ATTORNEYS

June 16, 1931.   R. J. MUSTO   1,810,251
ELECTRIC ARC WELDING PLANT
Filed July 25, 1929   2 Sheets-Sheet 2
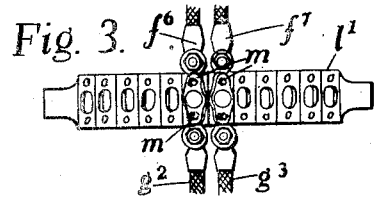
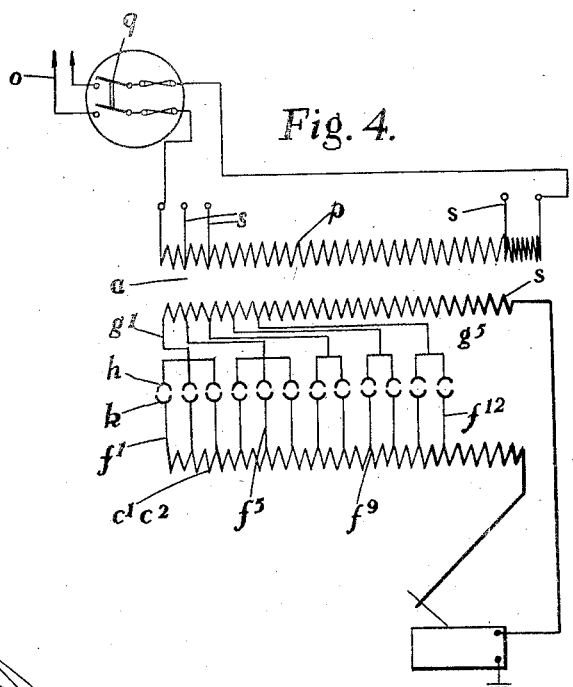
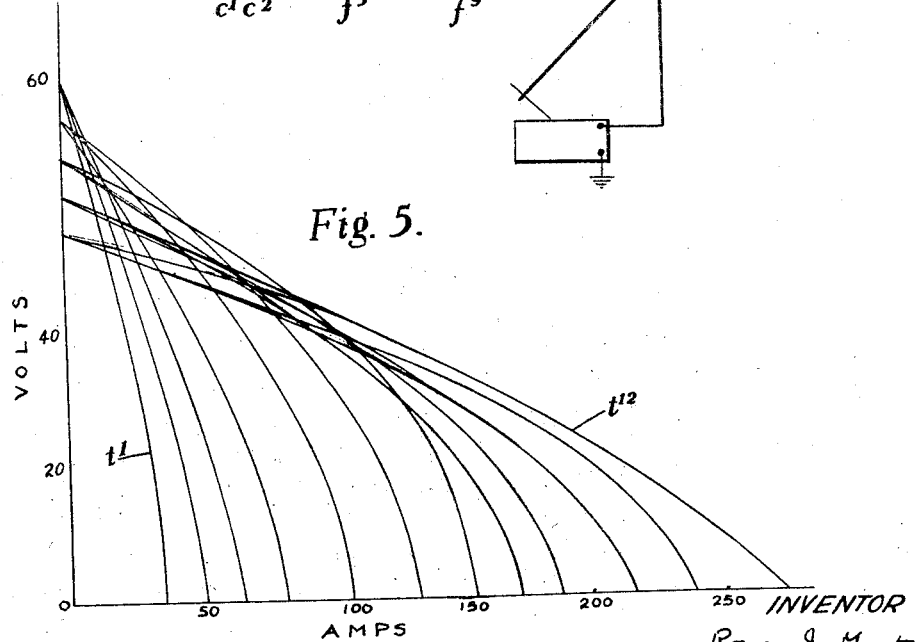
INVENTOR
Romeo J. Musto
BY
Gill & Jennings
ATTORNEYS.

Patented June 16, 1931

1,810,251

UNITED STATES PATENT OFFICE

ROMEO JOSE MUSTO, OF LONDON, ENGLAND, ASSIGNOR TO THE QUASI-ARC COMPANY, LIMITED, OF LONDON, ENGLAND, A BRITISH COMPANY

ELECTRIC ARC WELDING PLANT

Application filed July 25, 1929, Serial No. 381,042, and in Great Britain September 20, 1928.

This invention relates to apparatus for use in electric arc welding, of the type in which an alternating current is used, the supply for the welding arc being taken through a transformer having its secondary circuit connected through an inductance or choker with the electrode and the workpiece between which the arc is to pass. Hitherto, the usual practice has been to make the transformer and inductance or choker as separate units, and if these were provided with tappings, it was necessary to adjust the plug or connector on each unit when different current conditions were required; for example, on changing from one gauge of welding electrode to another. Such a plant has several disadvantages in practice, not only due to the complication which arises from changing two sets of connectors, but also due to the possibility of obtaining undesirable working conditions when a proper combination of connections has not been selected.

According to the present invention, tapping points on the secondary winding of the transformer and on the inductance coil or choker are brought out to contact members so that by means of a connecting plug or similar switching member, appropriate tappings from the secondary winding of the transformer are connected to appropriate tappings on the inductance coil in order to obtain ideal conditions for welding with any particular type of electrode of any particular gauge.

When smaller currents are used with small gauge electrodes, of course, a tapping from the choker coil is employed so as to include a large number of turns of that coil, and as it is desirable that under these conditions the open circuit voltage for the combination should be higher, it is arranged under those conditions for a tapping of the secondary winding to be used so that a large number of the turns of the secondary winding are in circuit. Thus, the plug or other switching member connects together in one position the tappings corresponding to a large number of turns of the choker coil and a large number of turns of the secondary winding of the transformer, and in positions at the other end of the range connects together tappings from the choker coil corresponding to a small number of turns and tappings from the secondary winding of the transformer corresponding to a small number of turns. The arrangement may be such that the welding electrode and the workpiece are connected directly to one terminal of the transformer and the choker coil respectively, so that the circuit is completed from that terminal of the secondary winding through the welding arc, through the turns of the choker coil which are in circuit, through the connecting plug and the secondary winding of the transformer.

Conveniently, the transformer and choker coil are made up as a single unit, the choker being, for example, mounted on top of the transformer but spaced somewhat apart from it as the choker will have an open magnetic circuit and it is not desired to have magnetic interference between the two parts.

An example of a construction of alternating current welding plant made in accordance with the invention will be described with reference to the accompanying drawings, wherein:—

Figure 3 is a detail elevation seen from the right of Figures 1 and 2 showing the construction of the contact members engaged by the connecting plug;

Figure 4 is a diagram of connections; and

Figure 5 shows typical characteristic curves for the plant with the connecting plug in its different positions.

Figure 1:
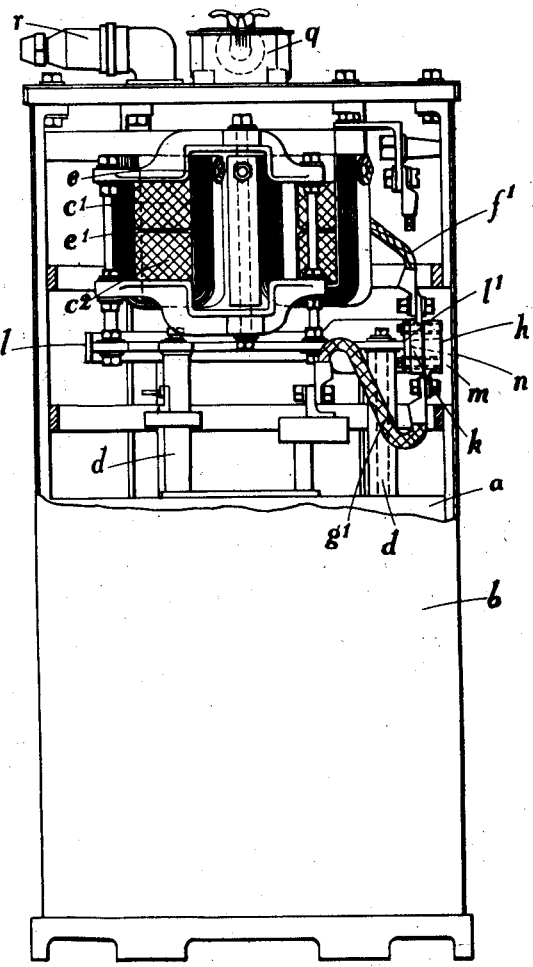
Figure 1 is a side elevation of the plant showing the upper part of the wall of the casing broken away.
Figure 2:
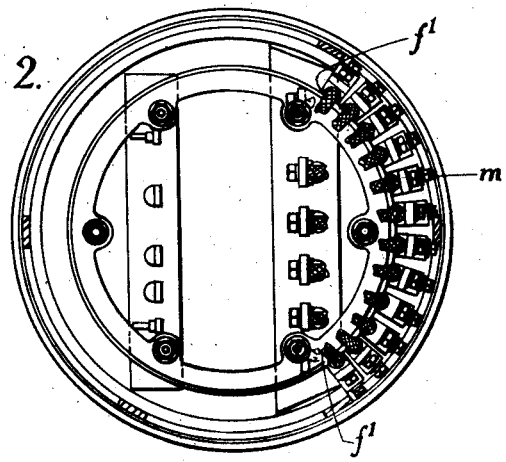
Figure 2 is a plan of the same with the cover removed.

Referring first of all to Figures 1 to 3, the transformer $a$ is housed in a steel casing $b$. The choker coil, consisting of two sections $c^1$, $c^2$ spaced apart, is supported considerably above the transformer $a$ by means of spacing pillars $d$. The coils $c^1$, $c^2$ are spaced apart with distance pieces between them and are wedged around the central iron core $e$ to provide for ventilation as both the choker coil and the transformer are air cooled. These coils are also shown surrounded by laminations $e^1$, but it is found in practice that sometimes better results may be obtained by omitting these laminations. The coils $c^1$, $c^2$ are wedged sufficiently rigidly to prevent mechanical distortion due to the forces arising from magnetic action.

Tappings $f^1$ to $f^{12}$ are taken from the winding of the choker coil $c^1$, $c^2$, and similar tappings $g^1$ to $g^5$ are taken from the secondary winding $s$ of the transformer $a$. The tappings $g^5$ are sub-divided, as shown in Figure 4, so as to be connected to twelve contact blocks $h$ associated with twelve contact blocks $k$ to which the choker coil tappings are taken. Any corresponding pairs of the blocks $h$ and $k$ can be connected together by a contact plug provided with an insulating handle, and which has to be removed each time from one pair of blocks and inserted in the position to bridge another pair of contact blocks.

The construction of the contact blocks is seen best in Figures 1 to 3. They are carried upon an extended part $l^1$ of a ring $l$ rigidly supported below the choke coil. The tappings $f^1$ to $f^{12}$ from the choke coil end in blocks $k$ which, as seen in Figures 1 and 2, lie immediately to the front of, but insulated from, the extended ring $l^1$. A sheet of pure mica is laid over the blocks $k$, and then the blocks $h$, connected to the tappings from the secondary winding $s$, are placed in front of the sheet of mica and the whole bolted up to the extended ring $l^1$ by means of bolts $m$, which are provided with insulating bushings and washers so as not to short-circuit the connecting plug. As can be seen in Figure 1, the blocks $h$ and $k$ are provided with a tapered hole into which the contact plug, not shown, can be inserted to connect the blocks $h$ and $k$ of any pair. For this purpose a series of holes $n$ are provided in the casing $b$ of the transformer to allow the plug to be inserted.

The primary winding $p$ of the transformer $a$ is connected direct to the alternating current mains $o$ through a switch fuse $q$ and plug $r$. Additional tappings in the primary winding $p$ are shown at $s$ to provide for alternating current supplies of different voltages.

The characteristic curves in Figure 5 correspond to the twelve positions for the plug shown in Figure 4. The curve $t^1$ corresponds to the tapping $f^1$ and the curve $t^{12}$ corresponds to the tapping $f^{12}$, and so forth. The curve $t^1$ is obtained with the plug in such a position that all the turns of the choker coil $c^1$, $c^2$ are in circuit, so that consequently the voltage drops away rapidly with the welding current, the maximum value of which, as can be seen from the curve, is slightly over 40 amperes. On the other hand, under these conditions the whole of the secondary winding $s$ is employed, so that the open circuit voltage, as shown by the curve, is of the order of 60 volts. On the other hand, with the plug in the position $t^{12}$, the minimum number of turns of the choker coil are in circuit, so that the voltage drops away only slowly as the welding current increases, and the maximum current, as shown by the curve, is about 265 amperes. Under these conditions also a minimum number of turns of the secondary winding $s$ are employed, so that the open circuit voltage is low; in fact, in the example illustrated, it is about 48 volts. It will be seen that intermediate values of open circuit voltage will correspond to intermediate values of welding current as used with intermediate gauges of electrodes.

It will be appreciated that the plant can be modified in construction to a considerable extent without departing from the invention. It is obvious that instead of a connecting plug, any other form of switch element might be employed which by a single operation could make contact between the appropriate tappings of the secondary winding of the transformer and of the choke coil. For example, a pivoted switch arm with two contact brushes which can simultaneously make contact with a ring of contact blocks connected to the secondary winding of the transformer and with a concentric ring of blocks connected to the tappings of the choke coil would serve precisely the same purpose. Oftentimes the operator needs to work at some distance from the welding plant, so that it is convenient to provide him with a separate switch for opening and closing the circuit, or the plant may have such a switch as that shown at $q$ arranged to be operated by remote control through a relay contact conveniently placed for the operator.

I claim:—

1. An alternating current arc welding plant comprising in combination, a welding transformer having a tapped output winding, a choke coil having its winding also tapped and having its magnetic field separate from and uninfluenced by the magnetic field of said transformer, a set of contact members connected to the taps of the output winding of said transformer, a second set of contact members connected to the taps of the winding of said choke coil, and a connector for joining at one time any one contact member of the first set to the corresponding contact member of the second set, the connection of said taps to said contact members being such that when the number of turns of said output winding in circuit is increased the number of turns of the winding of said choke coil in circuit is also increased.

2. An alternating current arc welding plant comprising in combination, a welding transformer having a tapped output winding, a choke coil having its winding also tapped and having its magnetic field separate from and uninfluenced by the magnetic field of said transformer, a set of contact members connected to the taps of the output winding of said transformer, a second set of contact members each of which is associated with one of the contact members of said first set and is connected to one of the taps of said choke coil and a removable contact plug for connecting together any associated pair of said contact members, the connection of said taps to said contact members being such that when the number of turns of said output winding in circuit is increased the number of turns of the winding of said choke coil in circuit is also increased.

3. An alternating current arc welding plant comprising in combination, a welding transformer having a tapped output winding, a choke coil having its winding also tapped and having its magnetic field separate from and uninfluenced by the magnetic field of said transformer, an output terminal connected to one end of the said output winding, an output terminal connected to one end of the winding of said choke coil, a set of contact members connected to the taps of the output winding of said transformer, a second set of contact members connected to the taps of the winding of said choke coil and a connector for joining at one time any one of the contact members of the first set to the corresponding contact member of the second set, so as to include in circuit between said terminals a number of turns of the winding of said choke coil with a related number of turns of the output winding of said transformer the connection of said taps to said contact members being such that when the number of turns of said output winding in circuit is increased the number of turns of the winding of said choke coil in circuit is also increased.

4. An alternating current arc welding plant comprising in combination, a housing, a welding transformer, having a tapped secondary winding, a choke coil having its winding also tapped and constructed as a single unit with, but spaced away from said transformer, said transformer and said choke coil being housed in said housing, a set of contact members connected to the taps of the output winding of said transformer, a second set of contact members connected to the taps of the winding of said choke coil, a connector for joining at one time any one contact member of the first set with the corresponding contact member of the second set, and an isolating switch mounted on said housing and included in the input leads to the primary winding of said transformer, the connection of said taps to said contact members being such that when the number of turns of said output winding in circuit is increased the number of turns of the winding of said choke coil in circuit is also increased.

5. An alternating current arc welding plant comprising in combination, a cylindrical containing housing with a row of perforations in its cylindrical surface, a welding transformer mounted in the lower part of said housing and having a tapped output winding, a choke coil mechanically supported above, but spaced from said transformer and having its winding also tapped, two sets of contact members arranged in two parallel rows within said housing adjacent said perforations, and connected respectively to the taps of the output winding of said transformer and to the taps of the winding of said choke coil, and a removable contact plug adapted to be inserted through said perforations to connect together corresponding contact members of the two sets the connection of said taps to said contact members being such that when the number of turns of said output winding in circuit is increased the number of turns of the winding of said choke coil in circuit is also increased.

6. An alternating current arc welding plant comprising a housing, a welding transformer, having a tapped secondary winding, a choke coil having its winding also tapped, and constructed as a single unit with, but spaced away from said transformer, said transformer and said choke coil being housed in said housing, a set of contact members connected to the taps of the output winding of said transformer, a second set of contact members connected to the taps of the winding of said choke coil, and a connector for joining at one time any one contact member of the first set with the corresponding contact member of the second set, the arrangement and connection of said contact members being such that when the number of turns of said output winding in circuit is increased the number of turns of the winding of said choke coil in circuit is also increased.

In witness whereof I hereunto subscribe my name this 3rd day of July, A. D. 1929.

ROMEO JOSE MUSTO.